United States Patent [19]
Horowitz

[11] 3,914,169
[45] Oct. 21, 1975

[54] OXYGEN DETECTOR HAVING A PLATINUM ELECTRODE ON A ZIRCONIA ELECTROLYTE

[75] Inventor: Samuel Jacob Horowitz, Snyder, N.Y.

[73] Assignee: E. I. Du Pont de Nemours & Company, Wilmington, Del.

[22] Filed: Nov. 25, 1974

[21] Appl. No.: 527,153

[52] U.S. Cl. ............................ 204/195 S; 204/1 T
[51] Int. Cl.² .................. G01N 27/30; G01N 27/46
[58] Field of Search ........ 204/195 S, 1 T; 136/86 F; 324/29, 33

[56] References Cited
UNITED STATES PATENTS
3,400,054  9/1968  Ruka et al. ........................... 204/1 T
3,844,920  10/1974  Burgett et al. ..................... 204/195 S

*Primary Examiner*—G. L. Kaplan

[57] ABSTRACT

An oxygen detection device for use in detecting oxygen in exhaust gases which has a first electrode exposed to the atmosphere, an intermediate layer formed of stabilized zirconium oxide, and a second electrode exposed to the exhaust gases which electrode is formed of from 76 to 97.6 weight percent platinum, from 1.2 to 12 weight percent of an oxide, and optionally from 1.2 to 12 weight percent of a glass which is stable under reducing conditions. The preferred oxides are aluminum oxide and the oxides of the lanthanide of series of rare earths such as cerium oxide. The preferred glasses are sodium borosilicate glasses and sodium alumina borosilicate glasses.

10 Claims, 1 Drawing Figure

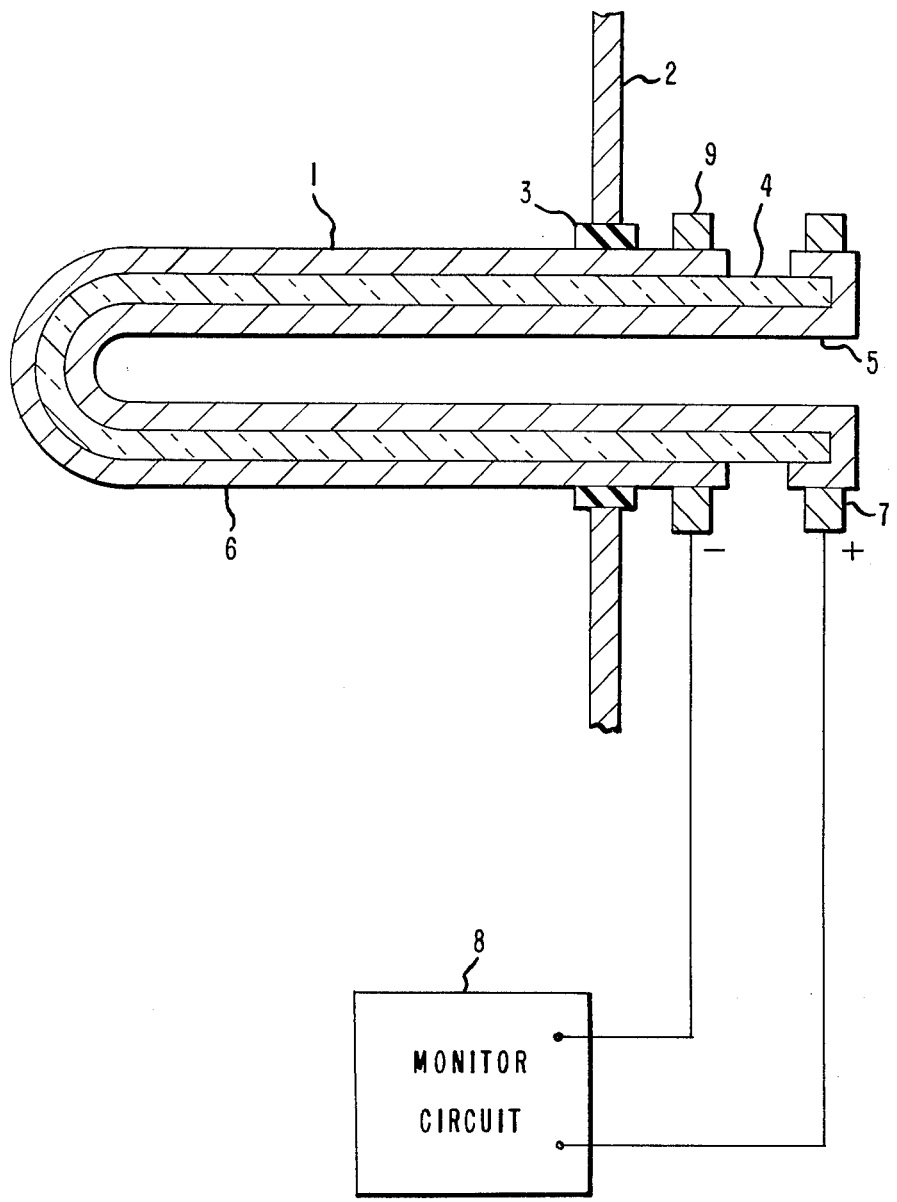

OXYGEN DETECTOR HAVING A PLATINUM ELECTRODE ON A ZIRCONIA ELECTROLYTE

BACKGROUND OF THE INVENTION

The present invention relates to a device for measuring the oxygen content of exhaust gases from fossil fuel combustion, such as the exhaust gas from gasoline engines. Such devices are known and are described in W. J. Fleming, D. S. Howarth and D. S. Eddy's "Sensor for On-Vehicle Detection of Engine Exhaust Gas Composition," Paper No. 730575, presented at SAE National Automobile Meeting, Detroit, Michigan, May 1973 (20 pages). In general such devices comprise a platinum electrode exposed to the atmosphere and a platinum electrode exposed to the exhaust gases. Sandwiched between these electrodes is a stabilized zirconium oxide layer which acts as an electrolyte which enables a potential difference (emf voltage) to be set up between the two electrodes.

Generally the platinum electrodes are applied by painting a platinum paste on the inner and outer surfaces of zirconium oxide tubes and then firing the tubes. The resulting platinum electrodes should be sufficiently porous to not interfere with the surfaces of the zirconium oxide tube, have high adhesion, high conductivity, and high abrasion resistance. The platinum should also have a high surface area because it also functions as a catalyst in the reaction between unburned fuel and excess oxygen in the exhaust stream. Conventional platinum pastes when used for the electrode exposed to the exhaust gases suffers from poor abrasion resistance and only fair surface area.

SUMMARY OF THE INVENTION

The present invention relates to a zirconia probe for detecting oxygen in exhaust gases. The probe is fitted with two intimately adherent electrodes. The first electrode is exposed to the atmosphere and its composition is not particularly critical, but it needs to be porous enough to permit the oxygen in the atmosphere to contact the zirconia. Generally this layer will be platinum. An inner layer of stabilized zirconia is sandwiched between the two electrodes. This electrolyte enables an emf to be generated between the electrodes. The second electrode is exposed to the exhaust gases and in accordance with the present invention is formed of from 76 to 97.6 weight percent platinum, from 1.2 to 12 weight percent of an oxide of either aluminum or a lanthanide series rare earth element such as cerium, and from 1.2 to 12 weight percent of a glass which is stable under reducing conditions such as sodium borosilicate glass. The second electrode is applied to the zirconia as a dispersion of from 82 to 15 weight percent of the solid materials described above in finely divided form in from 8 to 85 weight percent of an inert liquid organic vehicle. The coating is fired at about 900°C. to about 1200°C. to volatilize the vehicle and sinter the solids.

DESCRIPTION OF THE DRAWING

The drawing is a cross-sectional of an oxygen detection device of the present invention.

In the drawing the oxygen detection device is indicated generally at 1. The oxygen detection device 1 is fitted in the exhaust manifold 2 of a gasoline engine and held in place by gas tight electrically insulating adapter 3. Oxygen detection device 1 comprises stabilized zirconia electrolyte 4, first inner electrode 5 which is exposed to the atmosphere, and second outer electrode 6 which is exposed to the exhaust gases inside manifold 2. First inner electrode 5 is fitted with a clamp connector 7 which in turn is electrically connected to monitor circuit 8. Second outer electrode 6 is fitted with a clamp connector 9 which is also electrically connected to monitor circuit 8.

DETAILED DESCRIPTION

When conventional platinum electrode compositions are fired at temperature high enough to yield acceptable adhesion on zirconia bodies the resulting metallization possesses low surface area and high porosity. This low electrode surface area is known to result in a low capacity of the electrode to function as a catalyst in the reaction between unburned fuel and excess oxygen in the exhaust gases. In addition, the large pores in conventional fired platinum electrodes cause the detector to respond sluggishly to changes in the ratio of oxygen to fuel. The increased rates of surface, grain boundary and volume diffusions which result in sintering and grain growth during high temperature firing are responsible for the decrease in surface area. It has been found that adequate adhesion and the required high surface area, small pore size, and low pore density of the fired electrode may be achieved by providing an electrode composition with the addition of fine particle sintering or grain growth inhibitors and optionally finely divided glass powders to yield abrasion resistance at low firing temperature.

Generally the platinum comprises from 76 to 97.6 weight percent of the solids. If desired the platinum can be an alloy of platinum with a minor amount of another noble metal such as gold or palladium to reduce the cost of the electrode. However, platinum alone is preferred because of its catalytic activity in oxidizing unburned fuel. The platinum should be finely divided and which will pass a 325-mesh screen (U.S. sieve series) and have a surface area of from 5 to 50 $m^2/g$ and preferably a surface area of 15 to 25 $m^2/g$.

The fine particle sintering or grain growth inhibitor used herein is an oxide of aluminum or a lanthanide series rare earth element such as cerium. If desired, mixtures of these oxides may be used, generally the amount of such oxide used will be from 1.2 to 12 weight percent of the total solids used. These materials also impart improved abrasion resistance to the electrode when the electrode paste is applied to the unfired zirconia body and cofired therewith. This cofiring requires very high temperatures of about 1600°C. Generally these oxides used herein will pass a 325-mesh screen (U.S. sieve series).

The glass as used herein should be free of easily reducible oxides such as lead oxide, because some metals such as lead have a strong tendency to poison platinum catalysts; and for at least part of the time the exhaust gases will have a reducing action. Generally the glass will be used as a powder prepared by rapidly quenching molten glass followed by milling and screening. Generally the milled glass powder will pass a 325-mesh screen (U.S. sieve series). Generally the amount of glass used will be from 1.2 to 12 weight percent of the total solids used. The glass serves to improve the adhesion of the electrode to the zirconia. Suitable glasses include, but are not limited to, sodium borosilicate glasses, sodium alumina borosilicate glasses, and lithium alumina silicate glasses.

The particular organic liquid vehicle used is not particularly critical. Generally it should be inert to the solid materials used, should be liquid at room temperature, and should be removable from the system by heating at no more than 900°C. For example, methyl, ethyl, propyl, butyl, or higher alcohols, the corresponding esters such as the carbitol acetates, the terpenes and liquid resins, for example, pine oil, alpha-terpeneol, and the like, and other liquids without limitation, the function of the liquid vehicle being mainly to form a liquid or paste of the desired consistency for application purposes. The liquid vehicles may contain volatile liquids to promote fast setting after application or they may contain waxes, thermoplastic resins such as cellulose acetate butyrate, or wax-like materials which are thermofluid by nature whereby the composition can be applied to the zirconia while at an elevated temperature so as to set immediately upon contact with the zirconia. The viscosity of the paste formed by the solids and vehicle normally will have a viscosity of from 100 to 5,000 poises at 20°C.

The electrode which is exposed to the atmosphere has much less stringent requirements and many materials such as conventional pure platinum or platinum containing noble metal alloys or even silver may be used satisfactorily for this purpose although the above-described electrodes are excellent for this purpose.

The zirconia used ordinarily is stabilized with chemical additives because pure zirconia undergoes phase transitions at from 400°–800°C. which is included in the range of temperatures, encountered as the temperature is varied from ambient to that encountered in engine exhaust conditions. Generally from 1 to 25 weight percent of a stabilizing agent is used. Mgo, Cao, and $Y_2O_3$ are satisfactory stabilizing agents. The addition of the stabilizing agent also serves to increase the conductivity of the zirconia. About 5 weight percent of the stabilizing agent as based on the zirconia present is the optimum amount. Typically the zirconia will also contain about 0.5 weight percent silica and about 1–2 weight percent of miscellaneous impurities. The zirconia may be molded into the desired shape and coated with the electrode compositions prior to firing. Alternatively, the fired zirconia body can be coated with the electrode composition and refired to sinter the electrode composition. If an unfired or green zirconia body is coated with the electrode composition and then cofired, better adhesion is obtained and it is not necessary to add the glass in order to obtain adequate abrasion resistance. When a prefired zirconia base is used, it is preferred to fire the electrode at from 900 to 1200° C. and a distinct advantage in abrasion resistance is obtained by having the glass present.

The oxygen detectors of the present invention find use in detecting the amount of oxygen present exhaust gases from fossil fuel combustion generally. Recently there has been considerable urgency to produce gasoline engines which produce a minimal amount of carbon monoxide, unburned hydrocarbons, and nitrogen oxides in their exhaust. It is known that a single-bed noble metal catalyst without secondary air injection can simultaneously oxidize carbon monoxide and hydrocarbons and reduce oxides of nitrogen with nearly complete conversion, provided the engine air fuel ratio is regulated very close to 14.8. This is the principle expected to be used in many automobile catalytic converters. The oxygen sensors of the present invention find one of their most practical uses in conjunction with such catalytic converters. For exhaust temperatures in excess of 400°C., the sensor is self activating; that is, oxygen ions are conducted through the zirconia tube wall from the air atmosphere to the electrode exposed to the exhaust gases. Although the physical process at work is substantially different, the zirconia acts like a liquid electrolyte. The overall effect is to create a simple electrochemical cell which develops a potential difference (emf voltage) between the two electrodes.

Sensor output voltage is a logarithmic function of the ratio of the partial pressures of oxygen on either "side" of the cell wall. Since one side of the cell is exposed to the atmosphere with essentially constant oxygen partial pressure, the cell output voltage indicates the partial pressure of oxygen at the surface exposed to exhaust gas. As the air to fuel ratio becomes leaner, exhaust oxygen concentration increases and the ratio of partial pressures approaches unity, whereupon the output voltage drops to near zero.

When the air to fuel ratio becomes richer, oxidizable gases such as carbon monoxide and hydrogen are present. Under these conditions it is convenient to think of the sensor as a miniature electrochemical fuel cell in which these gases become a fuel source for the cell. At the exhaust side of the sensor, the platinum electrode catalytically enhances chemical oxidation reactions which in turn deplete the concentration of oxygen at that surface. An extraordinarily low surface concentration of oxygen results and the sensor voltage rises to almost one volt. Thus, the sensor generates levels of emf voltage which are proportional to the relative concentrations of combustible gases in the exhaust. Rapid voltage changes take place as the air to fuel ratio is swept across the stoichiometric point from lean to rich, or vice versa. Since lead, phosphorus and sulfur can poison the catalytic activity of platinum, the gasoline used should be free of these materials. The sensors can be used with either fuel injected or carburated engines, but is most readily integrated into an electronic fuel injection system. As can readily be appreciated, the weight of fuel to air is constantly changing under a given engine setting due to fluctuations in atmospheric conditions such as temperature and barometric pressure.

DESCRIPTION OF THE PREFERRED EMBODIMENTS

In each of the examples the platinum used is in the form of finely divided particles which pass a 325-mesh screen (U.S. sieve series) and have a surface area of about 20 square meters per gram. In each example the vehicle used is a solution of 10 weight percent ethyl cellulose in $\beta$ terpineol.

EXAMPLE I

A composition is prepared containing 50 weight percent platinum, 46 weight percent vehicle, and 4 weight percent of finely divided $Al_2O_3$ which passes a 325-mesh screen (U.S. sieve series).

EXAMPLE II

A composition is prepared which contains 50 weight percent platinum, 46 weight percent vehicle, and 4 weight percent of finely divided $CeO_2$ which passes a 325-mesh screen (U.S. sieve series).

EXAMPLE III

A composition is prepared containing 50 weight percent platinum, 46 weight percent vehicle, and 4 weight percent of a glass powder containing 7.7 weight percent $Na_2O$, 38.2 weight percent $B_2O_3$, and 54.1 weight percent $SiO_2$ which frit passed a 325-mesh screen (U.S. sieve series).

EXAMPLE IV

A composition is prepared containing 50 weight percent platinum, 46 weight percent vehicle, and 4 weight percent of a glass powder containing 13.9 weight percent $Na_2O$, 15.6 weight percent $Al_2O_3$, 28.5 weight percent $B_2O_3$, 37.9 weight percent $SiO_2$, 4.1 weight percent $K_2O$ which frit passed a 325-mesh screen (U.S. sieve series).

EXAMPLE V

A composition is prepared containing 50 weight percent platinum, 46 weight percent vehicle, and 4 weight percent of a glass powder of a lithia alumina silica glass.

EXAMPLE VI

A composition is prepared containing 50 weight percent platinum and 50 weight percent vehicle. This is a conventional platinum paste and is included herein for comparative purposes.

EXAMPLE VII

A composition is prepared containing 50 weight percent platinum, 46 weight percent vehicle, 2 weight percent of the $CeO_2$ used in Example II, and 2 weight percent of the glass used in Example IV.

The electrical resistance, abrasion resistance, and density of the compositions of Examples I, II, IV, VI, and VII when fired on prefired zirconia substrates is reported in Table I. The coatings are fired for 10 minutes at the temperature indicated in Table I. The zirconia substrate has been prefired at 1600°C. and contained 5 weight percent CaO, one-half weight percent $SiO_2$, and between 1 and 2 weight percent unknown impurities. The resistance reported in Tables I and II is determined across one-half inch of surface. The abrasion test is performed by uniformly applying an air stream of abrasive particles to each test piece. The time reported in Tables I and II is the time it took to reduce the conductivity to 0. The density is the degree of sintering modification as observed by optical microscopy. Excellent means that few pores are observed when fired at 900°–1100°C. Good means that few pores are observed when fired at 900° and 1000°C. Fair means that the pore growth is restricted when fired at 900°C. Poor means that pores are observed when fired at all temperatures.

TABLE I

| Example | Firing °C. | Resistance Ω | Abrasion Resistance Seconds | Density |
|---|---|---|---|---|
| I | 1200 | 0.4 | 105–110 | Excellent |
| I | 1100 | 0.6 | 70–75 | Excellent |
| I | 1000 | 0.6 | 55–60 | Excellent |
| I | 900 | 0.6 | 35–40 | Excellent |
| II | 1200 | 0.4 | 95–100 | Excellent |
| II | 1100 | 0.6 | 50–55 | Excellent |
| II | 1000 | 1.2 | 25–30 | Excellent |
| II | 900 | 1.4 | 15–20 | Excellent |
| IV | 1200 | 0.8 | 85–90 | Poor |
| IV | 1100 | 0.5 | 85–90 | Poor |
| IV | 1000 | 0.3 | 105–110 | Poor |
| IV | 900 | 0.5 | 105–110 | Poor |
| VI | 1200 | 0.3 | 110–115 | Fair |
| VI | 1100 | 0.3 | 55–66 | Fair |
| VI | 1000 | 0.3 | 35–40 | Fair |
| VI | 900 | 0.3 | 30–35 | Fair |
| VII | 1200 | 0.3 | 265–270 | Good |
| VII | 1100 | 0.4 | 260–265 | Good |
| VII | 1000 | 0.3 | 190–195 | Good |
| VII | 900 | 0.4 | | Good |

Table II reports the electrical resistance and abrasion resistance of the compositions of Examples I, II, IV, VI, and VII when cofired on a green zirconia substrate at 1600°C. during a 24 hour firing cycle. The zirconia composition used is the same as that described above in the introduction to Table I.

TABLE II

| Example | Resistance Ω | Abrasion Sec. |
|---|---|---|
| I | 0.4 | 325–330 |
| II | 0.6 | 470–480 |
| IV | 1.2 | 40–50 |
| VI | 0.7 | 20–25 |
| VII | 0.5 | 185–190 |

The compositions of Examples III, IV, V, and VI are coated on a prefired zirconia substrate as described in the introduction to Table I and fired at 895° and 1090°C. for 15 minutes. A tinned 20 gauge copper wire is soldered to each of these electrodes and the force required to peel the wire away is reported in Table III.

TABLE III

| Example | Force lbs. |
|---|---|
| III | 3 |
| IV | 3 |
| V | 2 |
| VI | 1 |

I claim:

1. An oxygen detection device comprising a first electrode layer, an intermediate layer comprising zirconium oxide, and a second electrode layer comprising from 76 to 97.6 percent by weight platinum, and from 1.2 to 12 percent by weight of one or more oxides which are aluminum oxide or a lanthanide series rare earth element oxide.

2. The device of claim 1 wherein said first electrode comprises platinum and said second electrode layer contains from 1.2 to 12 percent by weight of a glass which is stable under reducing conditions.

3. The device of claim 2 wherein the oxide is aluminum oxide.

4. The device of claim 3 wherein the zirconium oxide layer contains from 1 to 10 percent by weight of a stabilizer selected from the class consisting of MgO, CaO, and $Y_2O_3$.

5. The device of claim 4 wherein the glass is a sodium borosilicate glass.

6. The device of claim 4 wherein the glass is a sodium alumina borosilicate glass.

7. The device of claim 2 wherein the oxide is cerium oxide.

8. The device of claim 4 wherein the zirconium oxide layer contains from 1 to 10 percent by weight of a stabilizer selected from the class consisting of MgO, CaO, and $Y_2O_3$.

9. The device of claim 8 wherein the glass is a sodium borosilicate glass.

10. The device of claim 8 wherein the glass is a sodium alumina borosilicate glass.

* * * * *